(12) United States Patent
Prevost et al.

(10) Patent No.: US 10,131,849 B2
(45) Date of Patent: Nov. 20, 2018

(54) NAPHTHA ISOMERIZATION PROCESS COMPRISING TWO THERMALLY INTEGRATED STEPS

(71) Applicant: AXENS, Rueil Malmaison (FR)

(72) Inventors: Isabelle Prevost, Rueil Malmaison (FR); Laurent Watripont, Nanterre (FR); Pierre-Yves Martin, Rueil Malmaison (FR); Jerome Pigourier, Meudon (FR)

(73) Assignee: AXENS, Rueil Malmaison (FR)

( * ) Notice: Subject to any disclaimer, the term of this patent is extended or adjusted under 35 U.S.C. 154(b) by 0 days.

(21) Appl. No.: 15/307,405

(22) PCT Filed: Apr. 20, 2015

(86) PCT No.: PCT/EP2015/058499
§ 371 (c)(1),
(2) Date: Oct. 28, 2016

(87) PCT Pub. No.: WO2015/165764
PCT Pub. Date: Nov. 5, 2015

(65) Prior Publication Data
US 2017/0058203 A1 Mar. 2, 2017

(30) Foreign Application Priority Data

Apr. 29, 2014 (FR) .................................... 14 53842

(51) Int. Cl.
*C10G 7/00* (2006.01)
*B01D 3/00* (2006.01)
(Continued)

(52) U.S. Cl.
CPC ............... *C10G 7/00* (2013.01); *B01D 3/007* (2013.01); *B01D 3/009* (2013.01); *B01D 3/143* (2013.01);
(Continued)

(58) Field of Classification Search
CPC .......... C10G 7/00; C10G 45/58; C10G 57/00; C10G 2300/104; C10G 2300/1044;
(Continued)

(56) References Cited

U.S. PATENT DOCUMENTS 3,131,235 A * 4/1964 Asselin ..................... C07C 9/16
585/737
4,246,073 A * 1/1981 Umeda .................. B01D 3/146
203/25
(Continued)

FOREIGN PATENT DOCUMENTS

FR 2413347 A1 7/1979

OTHER PUBLICATIONS

Arief Budiman et al., Optimal Side Heating and Cooling in a Distillation Column, 23 Energy 5, pp. 365-372 (1998).*
(Continued)

*Primary Examiner* — Prem C Singh
*Assistant Examiner* — Brandi M Doyle
(74) *Attorney, Agent, or Firm* — Millen White Zelano and Branigan, PC; Csaba Henter

(57) ABSTRACT

The present invention describes a process for the isomerization of a light naphtha with a view to forming high octane number gasolines, said process using a deisopentanizer and a deisohexanizer which are thermally integrated in a manner such as to reduce the consumption of the high temperature utilities employed in the process.

5 Claims, 3 Drawing Sheets

(51) Int. Cl.
    *B01D 3/32* (2006.01)
    *C10G 45/58* (2006.01)
    *C10L 1/06* (2006.01)
    *C10L 3/12* (2006.01)
    *B01D 3/14* (2006.01)
    *C10G 57/00* (2006.01)

(52) U.S. Cl.
    CPC ............ *B01D 3/322* (2013.01); *C10G 45/58* (2013.01); *C10G 57/00* (2013.01); *C10L 1/06* (2013.01); *C10L 3/12* (2013.01); C10G 2300/104 (2013.01); C10G 2300/1044 (2013.01); C10G 2400/02 (2013.01); C10L 2290/543 (2013.01)

(58) Field of Classification Search
    CPC .... C10G 2400/02; B01D 3/007; B01D 3/009; B01D 3/12; B01D 3/143; B01D 3/322; C10L 1/06; C10L 2290/543
    See application file for complete search history.

(56) References Cited

U.S. PATENT DOCUMENTS

2013/0008194 A1* 1/2013 Hattori ................. F25B 49/022
                                                              62/84
2015/0175505 A1* 6/2015 Glover .................... C07C 5/277
                                                              585/738
2016/0002131 A1* 1/2016 Glasspool ................ B01D 1/28
                                                              203/18

OTHER PUBLICATIONS

Peters et al., Plant Design and Economics for Chemical Engineers, Chapter 9 Optimum Design and Design Strategy, pp. 414-433 (1968).*
International Search Report dated Aug. 3, 2015, issued in corresponding PCT/EP2015/058499, 3 pages.
Cheng, H. et al., "Heat-Integrated Distillation Columns for Ternary Separations", URL (http://pubs.acs.org/doi/pdf/10.1021/i200030a031), Ind. Eng. Chem. Process. Des. Dev, XP055140707, Jul. 1, 1985, pp. 707-713.
Linnhoff, B. et al., "Heat Integration of Distillation Columns into Overall Processes", Chemical Engineering Science, vol. 38, No. 8, XP055140147, Aug. 1, 1983, pp. 1175-1188.
Linnhoff, B., "Use Pinch Analysis to Knock Down Capital Costs and Emissions", Chemical Engineering Progress, American Institute of Chemical Engineers, XP002384825, Aug. 1, 1994, pp. 32-57.
English translation Abstract of FR2413347A1 published Jul. 27, 1979 (1 page).

* cited by examiner

NAPHTHA ISOMERIZATION PROCESS COMPRISING TWO THERMALLY INTEGRATED STEPS

FIELD OF THE INVENTION

The invention relates to the field of the production of high octane number gasoline. Naphthas obtained from the atmospheric distillation of oil are normally principally constituted by hydrocarbons containing 5 to 10 carbon atoms (C5-C10 cuts). These naphthas are generally fractionated into a light naphtha cut (C5-C6 cut) and a heavy naphtha cut (C7-C10). The heavy naphtha cut is usually sent to a catalytic reforming process which produces a reformate.

The light naphtha cut essentially comprises hydrocarbons containing 5 or 6 carbon atoms (C5 and C6), but may additionally comprise hydrocarbons containing 4 or 7 or even 8 carbon atoms (C4, C7, C8). This cut is generally isomerized in an isomerization unit in order to increase the proportion of branched hydrocarbons, which have a higher octane number than straight chain hydrocarbons.

The isomerate and the reformate obtained are then sent to the gasoline pool with other bases or additives (catalytically cracked gasoline, alkylates, etc.).

Because of the steady reduction in the maximum quantity of aromatic compounds allowed in gasolines (less than 35% by volume of aromatics and less than 1% by volume of benzene in the EU), and the large quantities of aromatics in catalytically reformed gasolines, the importance of isomerates in the gasoline pool which do not contain aromatic compounds is increasing.

Thus, it is important to provide high-performance isomerization processes, both in terms of yield and in terms of octane number. These processes must also be of economic interest both as regards the level of investment and as regards operating costs. Thus, it is important to optimize the function of the isomerization reaction section and sections for fractionation of the feed or the effluent.

EXAMINATION OF THE PRIOR ART

Patent FR 2 828 205 describes a process for the isomerization of a C5-C8 cut, in which said cut is fractionated into a C5-C6 cut and a C7-C8 cut which are each isomerized separately under conditions specific to each cut.

U.S. Pat. No. 2,905,619 describes an isomerization process in which the C5-C6 cut obtained from a gasoline cut is separated into different fractions which are isomerized in two isomerization sections operated under specific conditions.

U.S. Pat. No. 7,233,898 describes an isomerization process with a fractionation section which just comprises stabilization or stripping and a deisohexanizer producing 2 to 4 different cuts.

Patent GB 1 056 617 describes a process for the isomerization of a C5-C6 cut comprising a deisopentanizer (denoted DiP), an isomerization of the isopentane-depleted cut (ISOM), a separation of the isomerized effluent in order to recover n-pentane (DP) which is recycled with the feed to the inlet to the deisopentanizer, and a separation of the branched C6 hydrocarbons (deisohexanizer) (denoted DiH), in order to recover branched C6 hydrocarbons with a high octane number, the complement being recycled to the isomerization reactor.

BRIEF DESCRIPTION OF DRAWINGS

The pieces of equipment of the prior art layout which are present in the layout in accordance with the present invention retain the same reference numeral given above in square brackets. The numerals for the streams and those for the lines which transport them are the same (shown in round brackets).

BRIEF DESCRIPTION OF THE INVENTION

Figure 1:
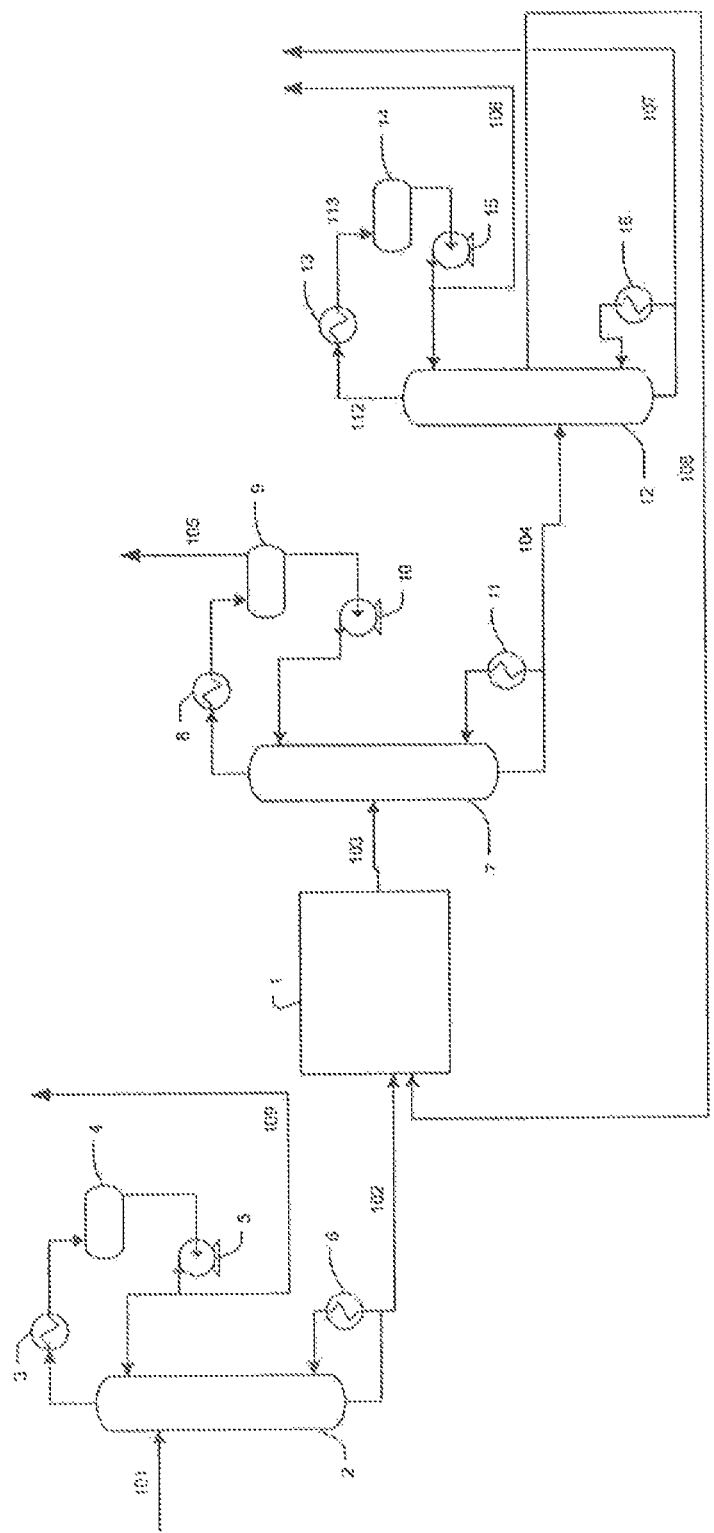
FIG. 1 represents the prior art layout, in which the principal equipment can be seen: the deisopentanizer column [2], the deisohexanizer column [12], the isomerization unit [1] and the column [7] for stabilizing the isomerization effluents.

The process in accordance with the present invention may be described as a process for the production of a high octane number gasoline cut starting from a light naphtha feed, comprising the following series of steps:

a)—a first step for separation by distillation, which can be used to separate hydrocarbons containing 5 carbon atoms from heavier compounds (i.e. iC5 or iC5+nC5, depending on the case), b)—a catalytic isomerization section [1], followed by a stabilization [7] of the isomerized effluent which consists of separating out the compounds which are lighter than the pentanes in a stabilization column [7], c)—a second step for separation by distillation, carried out using a deisohexanizer [12] consisting of a separation column in which the overhead products (106) and the bottom products (107) are the desired products from the process, and in which an intermediate cut which is enriched in n-hexane, removed as a side stream (108), is recycled to the reaction section [1], d)—a step for transferring heat between the two separation steps, carried out using an exchanger [13] in order to condense all or a portion of the overhead vapours from the deisohexanizer [12] by reboiling all or a portion of the bottom of the deisopentanizer column [2], by selecting an operating pressure for the condenser of the deisohexanizer [12] which is sufficiently high to allow this exchange to take place.

Preferably, the present invention combines the thermal integration of step d) with a means for maintaining the temperature of the majority of the energy required for the deisohexanizer [12] at a level equivalent to that which it would be at without thermal integration, i.e. with a lower condensation pressure for the DiH condenser, generally selected so as to be as low as possible, while being able to condense using the available cold utilities.

More precisely, the present invention can thus be categorized into two variations:

A first variation (corresponding to FIG. 2), in which the operating pressure of the deisohexanizer [12] is in the range 4 to 20 bar absolute, preferably in the range 5 to 13 bar absolute, and more preferably in the range 7 to 10 bar absolute, in order to allow the exchange of heat with the reboiler [6] of the deisopentanizer [2] which is operated at a temperature in the range 80° C. to 100° C., preferably in the range 85° C. to 95° C.

In this variation of the process in accordance with the invention, a lateral reboiler [19] is installed downstream of the bottom reboiler [16] of the deisohexanizer [12], the quantity of heat provided by the lateral reboiler [19] being at least 50% of the total quantity of heat required. The lateral reboiler [19] is preferably installed on the deisohexanizer [12] at a level located between 10 and 15 plates above the reboiler [16], in a manner such as to maintain the operating pressure of this lateral reboiler [19] to below 180° C., preferably to below 160° C.

A second variation (corresponding to FIG. 3) in which the operating pressure of the deisohexanizer [12] is less than or equal to 3 bar absolute, preferably less than 2 bar absolute, in order to allow the exchange of heat with the reboiler of the deisopentanizer [2] operated at a temperature in the range 80° C. to 100° C., preferably in the range 85° C. to 95° C.

In accordance with this second variation, the circuit for the overhead vapours from the deisohexanizer [12] is as follows:

The overhead vapours from the deisohexanizer [12] collected via the conduit (112) are compressed by the compressor [18], which is preferably centrifugal in type, to a pressure which is selected in a manner such as to be able to condense said overhead vapours in the exchanger [13] of the deisopentanizer [2].

Said compressed vapours are supplied via the conduit (114) to the exchanger [13] where they are condensed by heat exchange with the cold liquid originating from the bottom of the deisopentanizer [2] via the conduit 110. The liquid under pressure (115) obtained form the exchanger [13] is sent via the conduit (115) to the reflux drum [14] operated at a pressure which is greater than or equal to that of the deisohexanizer [12].

Still in accordance with the second variation of the process in accordance with the invention, the overhead vapours from the deisohexanizer [12] collected via the conduit (112) are preferably superheated in the exchanger [17] in contact with hot reflux (117) originating from the reflux drum [14], the compressor [18] being of the centrifuge type, and said compressed vapours being supplied via the conduit (114) to the shell of the exchanger [13] where they are condensed in contact with vertical tubes inside which the cold liquid (110) is moving.

Finally, in the context of the second variation of the process in accordance with the invention, a small fraction of the liquid under pressure (115) resulting from condensation carried out in the exchanger [13] can be vaporized by depressurization in the reflux drum [14], the vapours obtained from the reflux drum [14] being returned via the conduit (116) to the intake of the compressor [18] and the liquid from the reflux drum [14] being pumped via the reflux pump [15] and divided into a distillate evacuated via the conduit (106) and a reflux sent to the deisohexanizer [12] via the conduit (117) after cooling in the exchanger [17].

DETAILED DESCRIPTION OF THE INVENTION

The process in accordance with the present invention treats a light naphtha type feed and preferably a C5-C6 cut (cut of hydrocarbons containing 5 or 6 carbon atoms), and is intended to maximize the branched molecules compared with the straight chain molecules (or normal molecules). However, these feeds may optionally comprise other hydrocarbons, for example hydrocarbons containing 4 or 7, or even 8 carbon atoms (C4, C7, C8 cuts). However, preferably, the aim should be to limit the quantity of these hydrocarbons, for example by means of a prior separation. Regarding the C4 hydrocarbons, they may also be separated to a large extent in the stabilization column [7].

The invention is thus applicable to a process for the isomerization of a feed which is generally constituted by a light naphtha cut, preferably a C5-C6 cut which may optionally contain heavier hydrocarbons, in which the isomerate is obtained by intense conversion of compounds with low octane numbers from the C6 cut. This process requires the use of a reaction section and two separation steps.

The reaction section [1] is principally constituted by a reactor followed by a stabilization column [7] for effluents in order to separate the compounds which are lighter than the pentanes, The first separation step can be used to separate hydrocarbons containing 5 carbon atoms from the heavier compounds, in order to produce a C5 cut with a high octane number which will be a product from the unit. Depending on the quantity of iC5 in the feed, this section is placed upstream or downstream of the reaction section [1], and the heavier compounds are sent respectively either to the reaction section or to the second separation section. This first separation step is principally constituted by a deisopentanizer [2] (DiP) or by a depentanizer (DP), or by the 2 columns (deisopentanizer [2] (DIP) and depentanizer (DP)).

The second separation step may be used to fractionate the isomerate into a cut enriched in n-hexane which is recycled to the reaction section, and into two cuts which are rich in compounds with a high octane number which are the products from the unit. It is principally constituted by a deisohexanizer [12] (DiH). The cut enriched in n-hexane is removed as a side stream; the cuts rich in compounds with a high octane number are the overhead and bottom products from the column [12] which is placed downstream of the reaction section [1].

Figure 2:
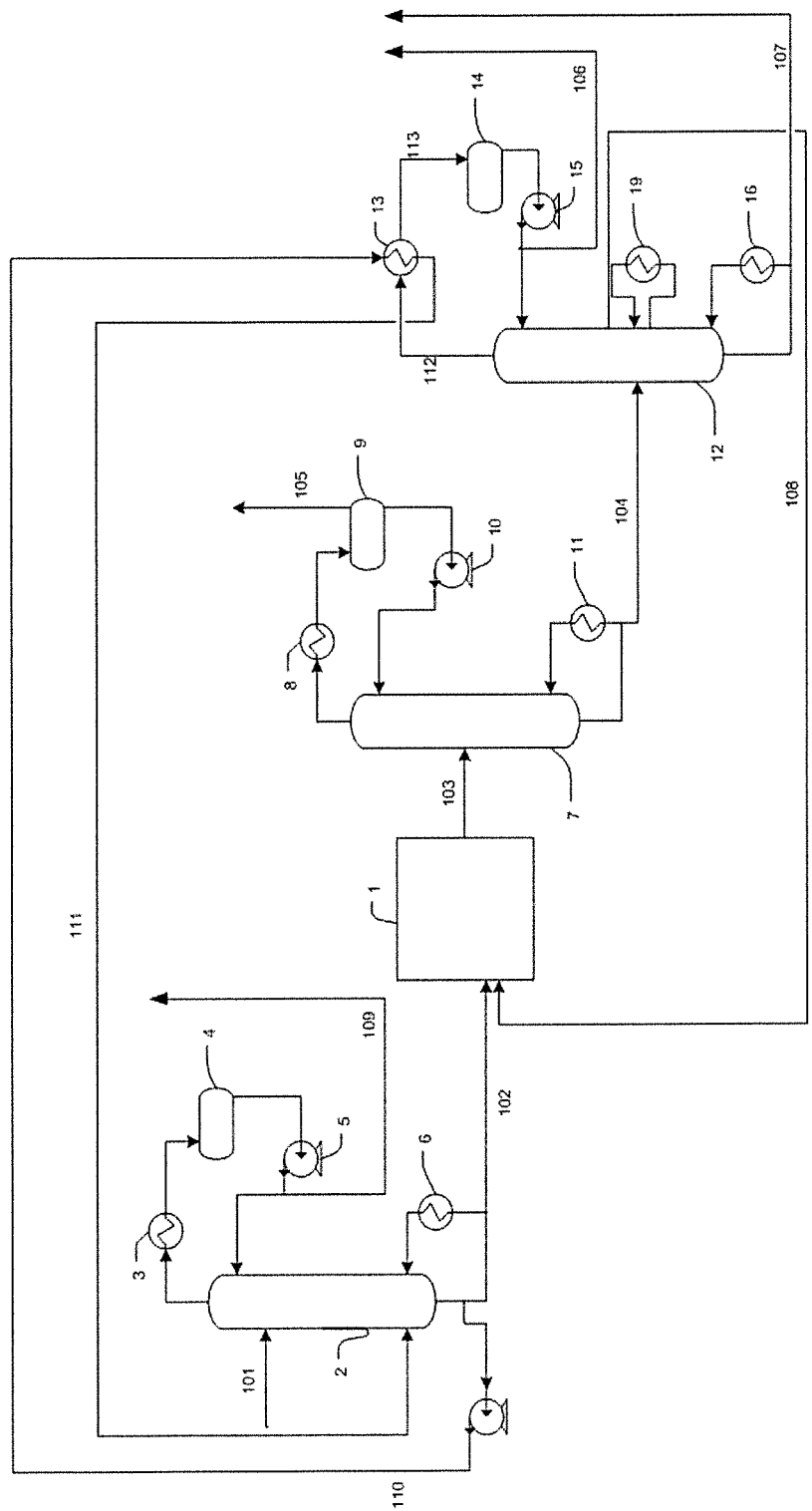
FIG. 2 represents the layout for the process in accordance with the present invention in a first variation in which more equipment of the prior art can be seen: the exchanger [13], which can be used to recover heat from the condenser of the column [12] in order to transfer it to the column reboiler [2].
Figure 3:
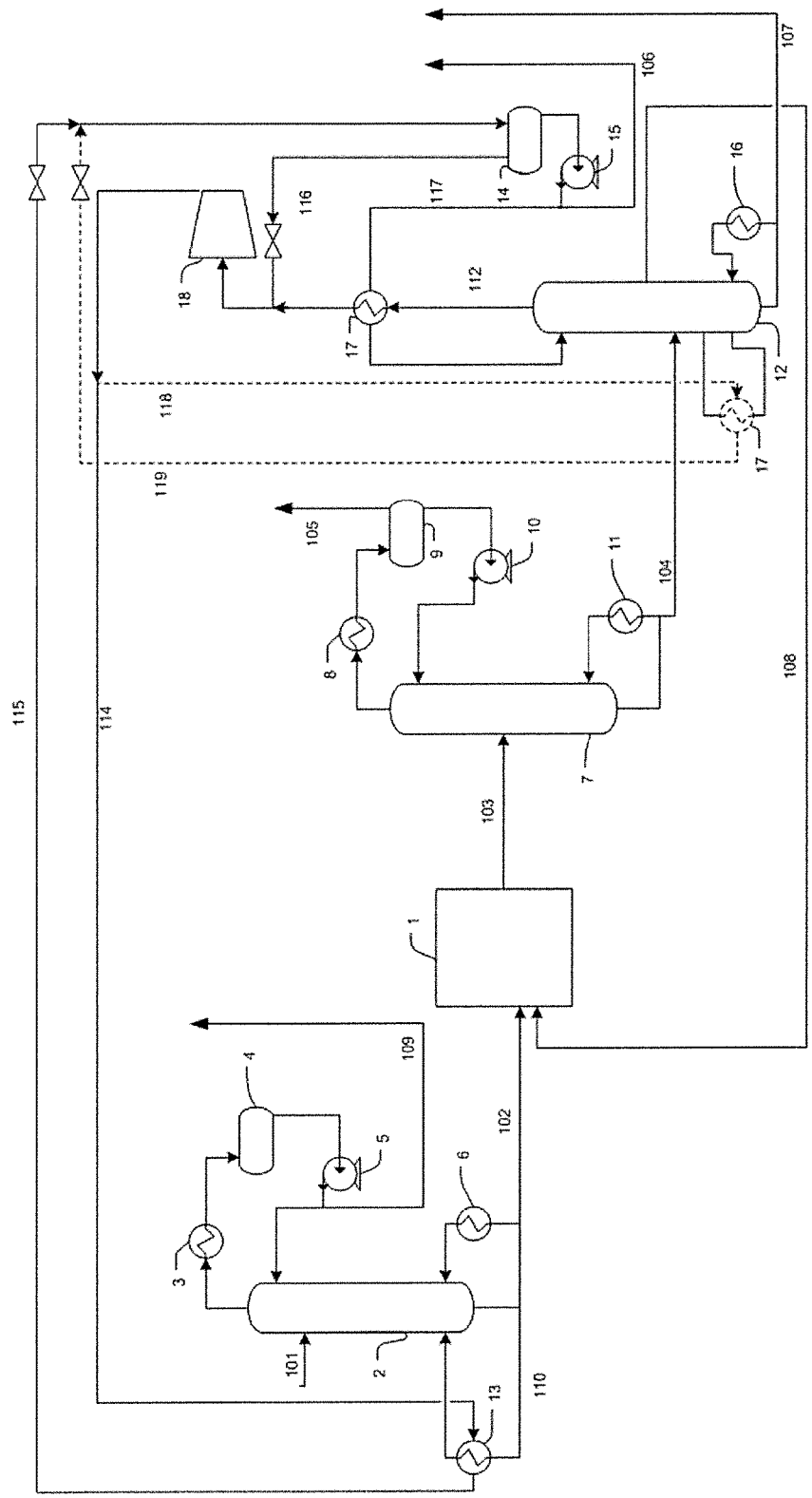
FIG. 3 represents a second variation of the process in accordance with the invention, in which the overhead effluent from the column [12] is compressed by means of a compressor [18] in order to be able to condense these overhead vapours in the reboiler [13] of the deisopentanizer [2].

In FIGS. 2 and 3 in accordance with the invention, the first separation step is placed upstream of the reaction section [1], this latter comprising only one deisopentanizer column [2] (DiP).

In the process in accordance with the invention, the two separation steps are thermally integrated. The aim of the invention is to modify the operating conditions for the second separation step (DiH) in a manner such as to transform at least a portion of the heat available at low temperature and dissipated into the atmosphere into heat which is available at a higher temperature, thereby substituting for some of the hot utilities' consumption in the first separation step.

To this end, the overhead vapours from the deisohexanizer [12] are condensed at a pressure which is higher than is required by the cold utilities which are available. The pressure increase is selected in a manner such that the temperature of this condensation is higher than the reboiler temperature of the deisopentanizer [2], thus allowing for direct heat exchange. Typically, the temperature differences between the condensation of the overhead vapours from the deisohexanizer [12] and the vaporization of the bottom liquid from the deisopentanizer column [2] are located in the range 5° C. to 15° C.

The invention preferably consists of combining this thermal integration with a means for maintaining the temperature of the majority of the energy required for the deisohexanizer [12] at a level which is equivalent to that which it would be without thermal integration, i.e. at the condensation pressure of the lower DiH condenser. This is in order to ensure that the energy savings obtained by the thermal integration are not counterbalanced by an additional cost of the utilities, which are henceforth hotter, required for the reboiler of the deisohexanizer [12].

More precisely, the process in accordance with the invention can be used to transfer heat between the two separation steps organized in a manner such as to reduce both the consumption of the hot utilities of the first separation step and the hot utilities of the second separation step without significantly increasing the consumption and the temperature of the hot utilities of said first step.

Implementation of the invention in the particular case in which the first step is constituted by a deisopentanizer [2] and the second step is constituted by a deisohexanizer [12] means that savings can be made on the one hand on the cold utilities at the head of the deisohexanizer [12] and on the other hand on the hot utilities for the reboiler of the deisopentanizer [2].

The process in accordance with the invention can thus be used to reduce the overall energy consumption of the system constituted by the two separation steps by 20%, preferably by 30%.

In the prior art FIG. 1, the feed is supplied to a deisopentanizer [2] via the conduit (101). The deisopentanizer [2] produces a stream (109) which is enriched in isopentane after passing through the exchanger [3], the reflux drum [4] and the reflux pump [5].

The feed, depleted in isopentane, is supplied to the isomerization reaction section [1] via the conduit (102).

The operating conditions for this reaction section [1] are selected in a manner such as to encourage the transformation of n-paraffins with a low octane number (n-pentane, n-hexane) into iso-paraffins with a higher octane number (isopentane, 2,2-dimethylbutane, 2,3-dimethylbutane, 2-methylpentane, 3-methylpentane).

The effluent (103) from the isomerization reaction section [1], once it has been stabilized by separating the light compounds in the stabilization column [7], is then directed to a deisohexanizer [12] via the conduit (104).

The overhead products (106) and bottom products (107) from the deisohexanizer [12], which have a higher octane number than that of the feed, are the products of the process.

The stream (107) essentially comprises hydrocarbons containing 7 carbon atoms or more (C7+), cyclohexane and possibly a little hexane, methyl-cyclopentane, methylpentanes and dimethylbutanes.

The stream (106) generally essentially comprises dimethylbutanes, pentanes, methylpentanes and cyclopentane. An intermediate cut which is enriched in n-hexane is removed from the deisohexanizer [12] as a side stream and recycled to the isomerization reaction section [1] via the conduit (108).

In its most general form, the process in accordance with the invention comprises:

a)—a first step for separation by distillation of the feed, which can be used to separate hydrocarbons containing 5 carbon atoms from heavier compounds (i.e. iC5 or iC5+nC5, depending on the case), b)—a catalytic isomerization section [1], followed by a stabilization [7] of the isomerized effluent which consists of separating out the compounds which are lighter than the pentanes overhead, and recovering an effluent from the bottom which is sent to the second separation step, c)—a second step for separation by distillation, carried out using a deisohexanizer [12] consisting of a separation column in which the overhead products (106) and the bottom products (107) are the products from the process, and in which an intermediate cut which is enriched in n-hexane, removed as a side stream (108), is recycled to the reaction section [1], d)—a step for transferring heat between the two separation steps, carried out using an exchanger [13] in order to condense all or a portion of the overhead vapours from the deisohexanizer [12] by reboiling all or a portion of the bottom of the deisopentanizer column [2], by selecting an operating pressure for the condenser of the deisohexanizer [12] which is sufficiently high to allow this exchange to take place.

Preferably, the thermal integration of step d) may be carried out with a means which can be used to maintain the temperature of the majority of the energy required for the deisohexanizer [12] at a level equivalent to that which it would be without thermal integration, i.e. with a lower condensation pressure for the condenser of the DiH.

The present invention carries out the heat transfer of step d) in accordance with two modes:

either by increasing the operating pressure of the deisohexanizer [12], which has the consequence of having to install a lateral reboiler [19] which supplies the majority of the heat at a temperature which is substantially close to that of the bottom reboiler for said column [12] when its operating pressure is selected so as to be the lowest possible permitted by the available cold utilities, or by maintaining the operating pressure of the deisohexanizer [12] at a level which is the lowest permitted by the available cold utilities, or even below this level, which causes the overhead vapours from the deisohexanizer [12] to be compressed in a compressor [18] in a manner such as to instigate the pressure and temperature conditions in the exchanger [13] which can be used to provide the thermal requirements for the reboiler of the deisopentanizer [2] with good efficiency.

The isomerization catalysts for the process in accordance with the invention may preferably be included in the group constituted by:

supported catalysts, most usually supported by a mineral support, typically an oxide (for example an aluminium oxide or silicon oxide or a mixture thereof) and containing at least one halogen and a metal from group VIII, zeolitic catalysts containing at least one metal from group VIII, Friedel-Crafts type catalysts, acidic or super-acidic catalysts, for example of the heteropolyanion (HPA) on zirconia, oxides of tungsten on zirconia or sulphated zirconia type.

The isomerization reaction is preferably operated in the presence of a high activity catalyst such as, for example, a catalyst based on chlorinated alumina and platinum functioning at low temperatures, for example between 100° C. and 300° C., preferably between 110° C. and 240° C., at high pressure, for example in the range 2 to 35 bars (1 bar=0.1 MPa) and with a low molar ratio of hydrogen/hydrocarbons in the range, for example, 0.1/1 to 1/1.

Preferred catalysts which are used are constituted by a high purity alumina support which preferably comprises 2% to 10% by weight of chlorine, 0.1% to 0.40% by weight of platinum and optional other metals.

They may be used at a space velocity in the range 0.5 to 10 $h^{-1}$, preferably in the range 1 to 4 $h^{-1}$.

Maintaining the degree of chlorination of the catalyst generally necessitates continuously adding a chlorinated compound such as carbon tetrachloride injected as a mixture with the feed at a concentration which is preferably in the range 50 to 600 parts per million by weight.

Other catalysts with an acidity comparable to these catalysts may also be used.

A first variation of the process in accordance with the invention (represented in FIG. 2) consists of increasing the pressure of the deisohexanizer in a manner such as to be able to condense the overhead vapours in the reboiler [13] of the deisopentanizer [2].

The exchanger [13] acts as a reboiler for the bottom liquid from the deisopentanizer [2] and as a condenser for the overhead vapours from the deisohexanizer [12].

In accordance with the invention, the operating pressure for condensation for the deisohexanizer [12], which is typically operated at a pressure of 2.5 bar absolute in the prior art, is in the range 4 to 20 bar absolute, preferably in the range 5 to 13 bar absolute, and more preferably in the range 7 to 10 bar absolute, in order to allow the exchange of heat with the reboiler of the deisopentanizer [2], which is generally operated at a temperature in the range 80° C. to 100° C., preferably in the range 85° C. to 95° C.

The bottom liquid from the deisopentanizer [2] is pumped via the pump [20] and sent via the conduit (110) to the exchanger [13] located above the reflux drum [14]. This exchanger [13] preferably operates by forced circulation.

At the outlet on the reboiler side, the liquid may be partially vaporized before returning to the column [2] via the conduit (111). The hot overhead vapours from the deisohexanizer [12] supplied via the conduit (112) are condensed in contact with the cold liquid originating from the deisopentanizer [2] in the exchanger [13] and are collected by controlling the level via the conduit (113) supplying the reflux drum [14].

This arrangement can be used to minimize the pressure difference between the deisohexanizer [12] and its reflux drum [14]. The quantity of condensation energy can in fact be controlled by varying the exchange surface area of the exchanger [13].

This pressure difference is thus less than 0.5 bar, and generally in the range 0.2 bar to 0.5 bar, which minimizes the operating pressure of the column [12] at iso-vapour condensation temperature.

Furthermore, the reboiler [6] which is independent of the deisopentanizer [2] can be used to amortize the fluctuations in the power of the condenser reboiler [13] and control the 2 columns independently.

A lateral reboiler [19] is installed on the deisohexanizer [12] by being located a certain number of plates above the reboiler [16], in a manner such as to maintain the operating temperature of this lateral reboiler [19] to below 180° C., and preferably to below 160° C. This number of plates is generally in the range 10 to 15. The reboilers [19] and [16] are preferably thermosiphons functioning by natural circulation.

The temperatures of the lateral reboiler [19] are typically compatible with the medium pressure steam system of a refinery without necessitating the use of high pressure steam.

The reboiler power required at a temperature of more than 180° C. for the reboiler [16] of the column [12] typically represents less than 50%, preferably less than 20% of the total reboiler power required by the column [12].

The second variation of the process in accordance with the invention (represented in FIG. 3) consists of only increasing the operating pressure of the condenser [13] of the deisohexanizer [12] while maintaining the operating pressure of the deisohexanizer [12], or even by reducing it.

The overhead vapours from the deisohexanizer [12] collected via the conduit (112) are superheated in the exchanger [17] in contact with hot reflux (117) originating from the reflux drum [14], then compressed by the compressor [18], typically of the centrifuge type, to a pressure selected in a manner such as to be able to condense these overhead vapours in the exchanger [13] of the deisopentanizer [2]. This exchanger [13] plays exactly the same role as in the first variation.

The overhead vapours (112) compressed after passing through the compressor [18] are supplied via the conduit (114) to the shell of the exchanger [13] where they are condensed in contact with the (preferably vertical) tubes inside which the cold liquid originating from the bottom of the deisopentanizer [2] via the conduit (110) is circulating. The liquid under pressure is sent via the conduit (115) to the reflux drum [14] operated at the pressure of the deisohexanizer [12]. A small fraction of this liquid is vaporized in the reflux drum [14] by depressurization. The vapours obtained from the reflux drum [14] are returned via the conduit (116) to the intake of the compressor [18].

The liquid from the reflux drum [14] is pumped by the reflux pump [15] and divided into a distillate which is evacuated via the conduit (106) and a reflux which is returned to the deisohexanizer [12] via the conduit (117) after cooling in the exchanger [17].

Thus, the level of heat required and the quantity of hot utilities for the deisohexanizer are not increased compared with the prior art.

The deisohexanizer [12] is operated at a pressure which is less than or equal to that of the prior art, depending on the relative cost of the hot utilities and electricity.

The operatiing pressure for condensation at the discharge from the compressor [18] is in the range 5 to 13 bar absolute and preferably in the range 7 to 10 bar absolute, in order to allow heat exchange with the reboiler [13] of the deisopentanizer [2], which has an operating temperature of the order of 90° C.

Depending on the level of heat in the available hot utilities and the relative cost of the utilities, the person skilled in the art will be able to combine variations 1 and 2 in order to maximize the profitability of the unit.

Examples in Accordance with the Invention

These examples are based on the feed with the detailed composition given in Table 1 below:

TABLE 1

| Composition of the feed | | |
|---|---|---|
| Mass flow rate | kg/h | 52 143 |
| isobutane | % by wt | 0.2% |
| n-butane | % by wt | 1.0% |
| isopentane | % by wt | 32.4% |
| n-pentane | % by wt | 43.0% |
| 2,2-dimethyl-butane | % by wt | 2.1% |
| 2,3-dimethyl-butane | % by wt | 1.3% |
| 2-methyl-pentane | % by wt | 11.4% |
| 2-methyl-hexane | % by wt | 2.3% |
| n-hexane | % by wt | 2.8% |
| cyclopentane | % by wt | 2.7% |
| methyl-cyclopentane | % by wt | 0.4% |
| benzene | % by wt | 0.4% |
| cyclohexane | % by wt | 0.0% |

The isomerization reaction section was constituted by 2 reactors in series.

The inlet temperature for the two reactors was 120° C.; the inlet pressure of reactor 1 was 35 bar absolute.

The inlet pressure for the second reactor was 33 bar absolute.

The catalyst employed was constituted by a ☐ alumina support comprising 7% by weight of chlorine, and 0.23% by weight of platinum and optional other metals.

The space velocity was 2.0 $h^{-1}$. The molar ratio of hydrogen to hydrocarbon was 0.1/1.

The recycle ratio for the hexanes is defined as the flow rate of fluid enriched in n-hexane recycled to the isomerization reaction section divided by the flow rate of fresh feed.

The product from the processes is defined as the mixture of overhead products (106) and bottom (107) products from the deisohexanizer and, if applicable, the overhead product from the deisopentanizer (109) enriched in isopentane.

The compositions of the products obtained as a function of the layout employed are summarized in Tables 2 to 4 below:

TABLE 2

Composition of product obtained from stream 106 (DiH overhead)

|  |  | FIG. 1 (Prior art) | FIG. 2 (Invention) | FIG. 3 (Invention) |
| --- | --- | --- | --- | --- |
| Mass flow rate | kg/h | 35550 | 35541 | 35555 |
| Butanes | % by wt | 0.5 | 0.5 | 0.5 |
| i-Pentane | % by wt | 53.3 | 53.3 | 53.3 |
| n-Pentane | % by wt | 15.4 | 15.4 | 15.4 |
| 2,2-Dimethylbutane | % by wt | 26.3 | 26.7 | 24.5 |
| 2,3-Dimethylbutane | % by wt | 1.0 | 0.5 | 2.0 |
| Methylpentanes | % by wt | 0.6 | 0.6 | 1.4 |
| Cyclopentane | % by wt | 2.9 | 2.9 | 2.9 |

TABLE 3

Composition of product obtained from stream 107 (DiH bottom)

|  |  | FIG. 1 (Prior art) | FIG. 2 (Invention) | FIG. 3 (Invention) |
| --- | --- | --- | --- | --- |
| Mass flow rate | kg/h | 236 | 236 | 235 |
| Dimethylbutanes | % by wt | 0.1 | 0.8 | 0.0 |
| Methylpentanes | % by wt | 0.9 | 5.3 | 0.6 |
| n-Hexane | % by wt | 2.0 | 5.2 | 1.9 |
| Methylcyclopentane | % by wt | 0.4 | 0.7 | 0.4 |
| Cyclohexane | % by wt | 7.6 | 5.3 | 10.1 |
| C7+ | % by wt | 89.1 | 82.7 | 87.0 |

TABLE 4

Composition of product obtained from stream 109 (DiP overhead)

|  |  | FIG. 1 | FIG. 2 (Invention) | FIG. 3 (Invention) |
| --- | --- | --- | --- | --- |
| Mass flow rate | kg/h | 15754 | 15754 | 15754 |
| Butanes | % by wt | 3.9 | 3.9 | 3.9 |
| Iso-pentane | % by wt | 91.1 | 91.1 | 91.1 |
| n-Pentane | % by wt | 5.0 | 5.0 | 5.0 |

Table 5 details the operating conditions for the columns of the various variations of the layouts in accordance with the prior art and in accordance with the invention.

TABLE 5

Comparison of various layouts

|  | FIG. 1 Prior art | FIG. 2 Invention | FIG. 3 Invention |
| --- | --- | --- | --- |
| Stabilization column |  |  |  |
| Number of theoretical plates | 20 | 20 | 20 |
| Operating pressure (bar abs) | 19 | 19 | 19 |
| Supply plate[1] | 8 | 8 | 8 |
| Power required at reboiler (MW) | 4.37 | 4.37 | 4.38 |
| Reboiler outlet temperature (° C.) | 172 | 172 | 172 |
| Reflux ratio/distillate flow rate | 4.74 | 4.73 | 4.74 |
| Deisohexanizer |  |  |  |
| Number of theoretical plates | 62 | 75 | 62 |
| Operating pressure (bar abs) | 3 | 9 | 1.5 |
| Supply plate[1] | 38 | 38 | 38 |
| Side stream take-off plate[1] | 49 | 64 | 49 |
| Power required at reboiler (MW) | 12.92 | 2.76 | 7.69 |
| Reboiler outlet temperature (° C.) | 167 | 206 | 136 |
| Power required at lateral reboiler (MW) | N/A | 15.41 | N/A |
| Lateral reboiler plate[1] | N/A | 62 | N/A |
| Lateral reboiler outlet temperature (° C.) | N/A | 155 | N/A |
| Reflux ratio/distillate | 4.00 | 6.20 | 3.60 |
| Power required at compressor (MW) |  |  | 2.86 |
| Deisopentanizer |  |  |  |
| Number of theoretical plates | 52 | 52 | 52 |
| Operating pressure (bar abs) | 3.71 | 3.71 | 3.71 |
| Supply plate[1] | 32 | 32 | 32 |
| Power required at reboiler (MW) | 18.00 | 18.00 | 18.00 |
| Power required at reboiler supplied by hot utilities (MW) | 18.00 | 0.00 | 5.71 |
| Reboiler outlet temperature (° C.) | 94 | 94 | 94 |
| Reflux ratio/distillate | 11.52 | 11.52 | 11.52 |
| Hexanes recycle ratio | 0.42 | 0.42 | 0.42 |

Note
[1]The supply and withdrawal plates are numbered in order with the plate numbers starting at the top with 1 and numbering towards the bottom.

Table 6 compares the results obtained with the various variations:

TABLE 6

Results

|  | FIG. 1 Prior art | FIG. 2 Invention | FIG. 3 Invention |
| --- | --- | --- | --- |
| Research Octane Number for product | 89.8 | 89.8 | 89.8 |
| Yield [1] | 0.988 | 0.988 | 0.989 |
| Mass flow rate at isomerization reactor (kg/h) | 58223 | 58222 | 58223 |
| Total reboiler power (MW) | 35.3 | 22.5 | 17.8 |
| Operating costs (reboiler utility + compressor electricity) |  |  |  |
| M$/year [2] | 9.3 | 6.3 | 6.1 |
| $CO_2$ emission [3] kg/h | 14609 | 9539 | 9760 |

Note
[1] Yield defined as mass flow rate of product divided by flow rate of fresh feed.
Note
[2] Operating costs based on the following assumptions:
Medium pressure steam: 18$/tonne
High pressure steam: 25$/tonne
Electricity: 60$/MW
Note
[3] Typical emission factor for hot utilities (source: natural resource Canada: « Benchmarking energy intensity in the Canadian steel industry », appendix B).
High pressure steam: 267 kg CO2/t
Medium pressure steam: 240 kg CO2/t
Low pressure steam: 224 kg CO2/t
Electricity: 856 kg/MWh Looking at Table 6, it is clear that:

The octane number of the product is identical for the prior art process and for the processes in accordance with the invention.

The process yield of the prior art process is also identical to those in accordance with the invention.

The hot utilities consumptions are reduced in the 2 variations in accordance with the invention:

a. In the variation of FIG. 1, the hot utilities are reduced by 12.8 MW. The quid pro quo is an increase in the temperature of a portion of these utilities is required, but this only amounts to 2.76 MW.

b. In the variation of FIG. 2, the hot utilities are reduced by 17.1 MW. The quid pro quo is an additional electrical consumption which is limited to 2.86 MW.

In the 2 variations, for identical product and yield, it can be seen that there is a large reduction in the consumptions of the hot utilities and thus in the associated operating costs: in variation 1 in accordance with the invention (FIG. 2), despite the required increase in the temperature of the utilities in the reboiler (small having regard to the hot utilities savings obtained), the saving in operating costs is 3 M$ per year.

In variation 2 in accordance with the invention (FIG. 3), despite the electrical consumption required for the compressor (small having regard to the savings in hot utilities obtained), the saving in operating costs is 3.2 M$ per year.

In respect of the $CO_2$ emissions for variations 2 and 3, reductions of the order of 35% were obtained.

The invention claimed is:

1. A process for the production of a high octane number gasoline cut starting from a light naphtha feed, comprising the following series of steps:
   a) a first step for separation by distillation of the light naphtha feed carried out in a deisopentanizer (2), which results in separation of a top effluent of hydrocarbons containing 5 carbon atoms and a heavy effluent (102) of heavier compounds,
   b) in a section (1), a step for catalytic isomerization of the heavy effluent (102) obtained from the first separation step to provide an isomerized effluent (103), followed by a step for stabilization (7) of the isomerized effluent (103), which stabilization step comprises separating out an effluent of compounds which are lighter than pentanes and a bottoms effluent,
   c) a second step for separation by distillation of the bottoms effluent from step b), carried out using a deisohexanizer (12) comprising a separation column and providing an overhead product (106), a bottom product (107), and an intermediate cut which is enriched in n-hexane removed as a side stream (108), wherein the intermediate cut is recycled and fed to section (1) for the catalytic isomerization step, and
   d) a step for transferring heat between the first and second separation steps, whereby heat is transferred between a condenser of the deisohexanizer (12) and a reboiler of the deisopentanizer (2) by a heat exchanger (13) in order to condense all or a portion of the overhead product from the deisohexanizer (12) and reboil all or a portion of the heavy effluent of the deisopentanizer column (2) and whereby the deisohexanizer (12) is operated at an operating pressure in the range of 7 to 10 bar absolute, and the reboiler of the deisopentanizer (2) is operated at a temperature in the range 80° C. to 100° C.

2. The process of claim 1, wherein the reboiler of the deisopentanizer (2) is operated at a temperature in the range 85° C. to 95° C.

3. The process of claim 1, wherein the deisohexanizer (12) is operated with a bottom reboiler (16) and a lateral reboiler (19) installed downstream of the bottom reboiler (16), and wherein the quantity of heat provided by the lateral reboiler is at least 50% of the total quantity of heat required for reboiling.

4. The process of claim 3, wherein the lateral reboiler (19) on the deisohexanizer (12) is situated between 10 and 15 plates above the bottom reboiler (16), in a manner such as to maintain the operating temperature of the lateral reboiler (19) below 180° C.

5. The process of claim 3, wherein the lateral reboiler (19) on the deisohexanizer (12) is situated between 10 and 15 plates above the bottom reboiler (16), in a manner such as to maintain the operating temperature of the lateral reboiler (19) below 160° C.

* * * * *